March 13, 1951  D. KAUFMAN  2,545,233

FILLING PLUG FOR OIL TANKS OR THE LIKE

Filed Dec. 19, 1946

Inventor
Daniel Kaufman
By Rockwell & Bartholow
Attorneys

Patented Mar. 13, 1951

2,545,233

UNITED STATES PATENT OFFICE 2,545,233

FILLING PLUG FOR OIL TANKS OR THE LIKE

Daniel Kaufman, New Haven, Conn.

Application December 19, 1946, Serial No. 717,117

2 Claims. (Cl. 226—117)

This invention relates to filling plugs for oil tanks or the like, and more particularly to a plug or seal adapted to be applied to the outlet pipe of a filling nozzle, so that a tight connection is made between this outlet pipe and the filler neck of a tank or other container into which liquid is being discharged from the nozzle.

In filling the fuel tanks of oil burners, for example, the operation is usually accomplished by a filling nozzle having a valve to control the flow of the oil through the nozzle, and the nozzle also having a rigid pipe which is inserted into the filler neck of a pipe leading to the tank. The tanks are usually located in the basement of a building, or underground, and this filler neck is upon the inlet end of the pipe, so that it is in an exposed position in order that the outlet pipe of the nozzle may be inserted therein. The tanks are usually provided with vent pipes in addition to the filler pipes, so that the air which is displaced by the entering fuel may escape through this vent pipe and does not have to escape around the outlet pipe of the nozzle.

It is, therefore, desirable for several reasons to make a tight connection between the outlet pipe of the nozzle and the filler neck, so that there will be no blowback of the oil about the outlet pipe. However, it sometimes occurs that where the oil enters the tank faster than the air is expelled therefrom, a pressure is built up inside the tank when a tight connection is made, this pressure sometimes becoming excessive and resulting in the rupture of the tank and the consequent leakage of oil therefrom.

It is, therefore, desirable to have some means to prevent the building up of excess pressure within the storage tank, and particularly some means to warn the attendant when this pressure reaches a certain point.

I contemplate by the present invention the provision of a simple and inexpensive structure to make a tight connection between the outlet pipe of the delivery nozzle on the hose of an oil truck, for example, and the filler neck of a storage tank, while, at the same time, providing means for the relief of excess pressure within the tank if this occurs and for notifying or warning the attendant that a predetermined amount of pressure exists, or has been built up, in the tank.

In the preferred form of my invention illustrated in the present application, this is accomplished by means of a collar or rubber or compressible material, this collar having an internal bore so that it may be slipped upon the outlet pipe of the nozzle and having a tapered or frusto-conical outer surface in order that it may be partially inserted into the filler neck of the storage tank and make a tight fit with the wall of the neck. Moreover, a passage is provided from the lower portion of the collar or plug through the upper portion thereof, so that the lower end of this passage will be in communication with the interior of the pipe leading to the storage tank, and the upper end of the passage will be above the filler neck so as to serve as a vent for the tank. The upper end of the passage is, however, closed by a pressure-relief valve, so that under ordinary conditions the passage will be closed. However, if the pressure in the tank builds up to the predetermined amount for which the valve is set, i. e., an amount which might become excessive, the valve will open and serve to vent the tank through the passage.

The venting of the air through the passage about the valve will usually be accomplished by a sputtering of oil, and, in any event, will serve to notify the attendant that the pressure within the tank has reached a predetermined maximum. If desired, an audible signal may be employed with the valve, so that the signal will sound when air is vented through the valve.

One object of the present invention is to provide a new and improved filling plug for oil storage tanks or the like.

A further object of the invention is to provide a plug or collar adapted to fit about the outlet pipe of a filling nozzle and make a tight fit with the filler neck of a storage tank, the collar being provided with means to warn the attendant if and when a predetermined pressure exists within the tank.

A still further object of the invention is to provide a filling collar or plug adapted to be applied to the outlet pipe of a filler nozzle, so as to make tight contact with the pipe and also with the filler neck of a storage tank, the collar being provided with a passage therethrough communicating at its lower end with the interior of the tank and having an outlet opening at its upper end, which latter opening is controlled by a pressure-relief valve adapted to open and permit air to vent from the storage tank when a predetermined pressure exists within the latter.

To these and other ends the invention consists in the novel features and combinations of parts to be hereinafter described and claimed.

Figure 1:
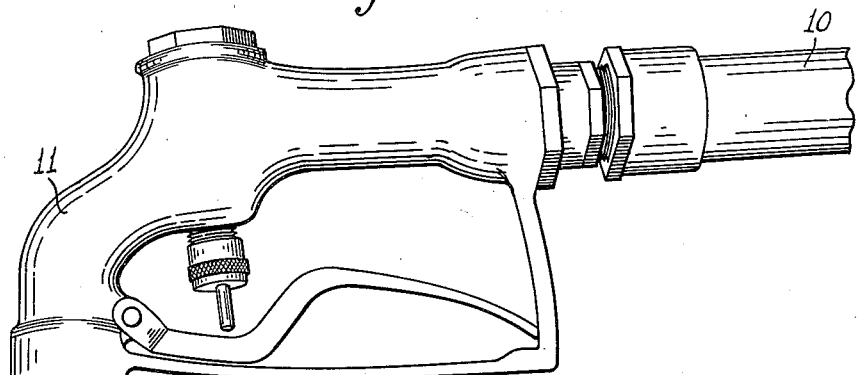
Fig. 1 is a side elevational view of a filler nozzle in operative position with respect to the filling neck of a storage tank, the outlet pipe of the nozzle having my improved sealing plug applied thereto.

To illustrate a preferred embodiment of my invention, I have shown in Fig. 1 of the drawings a portion of a hose 10 which may receive oil from a truck tank or the like, this hose having the nozzle 11 secured thereto, and to this nozzle is connected the rigid outlet pipe 12 through which the oil is delivered to the storage tank (not shown). The outlet pipe 12 is adapted to be received within the upper end of the filler neck 13 of the filling pipe 14 which leads to and communicates with the oil storage tank which is to be filled.

Figure 2:
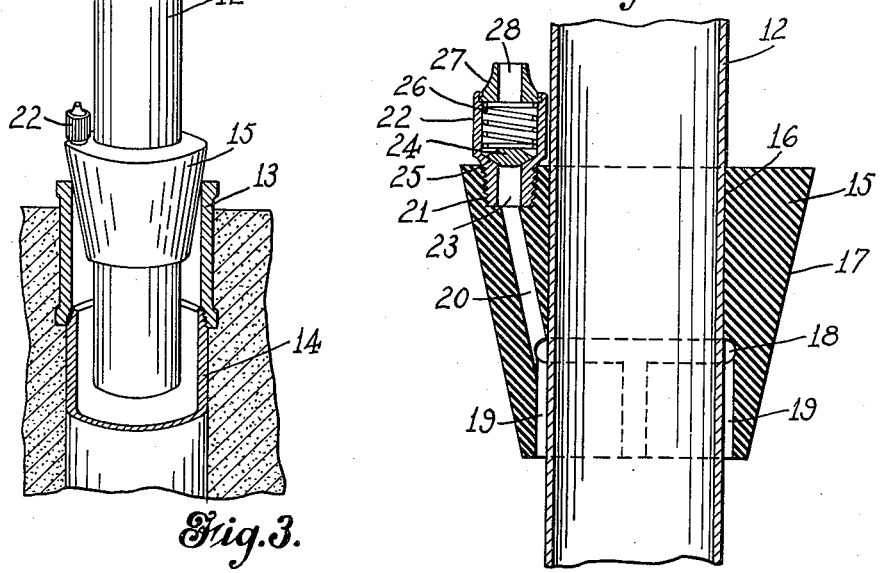
Fig. 2 is an enlarged sectional view of the outlet pipe and the filler plug.

A filling plug 15 is mounted upon the outlet pipe 12, this plug or collar being made of compressible material, such as natural or synthetic rubber, for example, so that it may make a tight fit within the filler neck. As shown in Fig. 2, the plug is provided with an internal bore 16 which fits tightly over the pipe 12, so that it may be slipped upon this pipe and make an airtight connection therewith. The plug, as shown, is of frusto-conical shape, the outer surface 17 being tapered inwardly and downwardly so that, as shown in Fig. 1, the lower end may be inserted to some extent into the neck 13 until the tapered outer surface of the plug makes a tight fit with the upper end of the filler neck, as shown in Fig. 1. This results in a substantially airtight connection being made between the pipe 12 and the filler neck 13 when the parts are in the position shown in Fig. 1.

Figure 3:
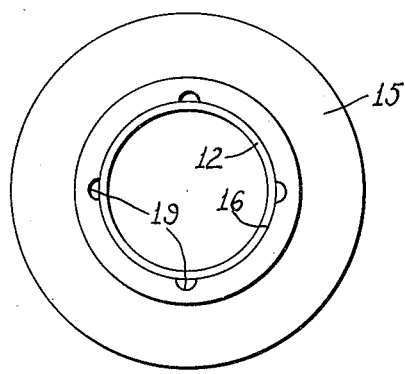
Fig. 3 is a bottom plan view of the parts shown in Fig. 2.

As previously stated, it is desirable, however, to prevent the building up of an excessive pressure within the storage tank, and means are provided to effect this result, which will now be described. Intermediate the upper and lower ends of the plug or collar 15 the latter is provided with an annular recess or channel 18 which communicates with the bore 16. Leading downwardly from this recess are a plurality of longitudinal channels or recesses 19 which communicate with the bore 16 of the plug and also open through the lower face of the plug as shown in Figs. 2 and 3. It will be apparent that with this arrangement the interior of the pipe 14, and, therefore, the interior of the storage tank will be in communication with the vertical or longitudinal channels 19 and, through them, with the annular channel or recess 18.

Leading upwardly from the channel 18 through the wall of the plug is a passage 20, which passage is provided with an enlarged upper end or counterbore 21 opening through the upper surface of the plug. Seated in the counterbore 21 is a valve casing 22 having an inlet opening 23 communicating with the passage 20 and a valve 24 loosely mounted in the casing 22 and adapted normally to close the inlet passage 23.

The valve casing is provided with a tapered valve seat 25 above the passage 23, and the valve is urged toward its seat by a spring 26 within the valve casing and seated at its lower end upon the valve 24. At the upper end of the valve casing is an outlet member 27 against the lower end of which the spring 26 reacts, this member being provided with a vent or outlet passage 28.

It will be apparent that the filling plug and the pressure-relief valve secured thereto may be very cheaply manufactured and assembled. To secure these two elements together, the lower portion of the valve casing may be provided with external screw threads, so that it may be threaded into the counterbore 21. Moreover, the structure may be mounted upon the outlet pipe 12 by merely inserting this pipe within the bore 16 of the plug, and, when the plug is inserted in the filler neck 13, the tapered outer surface will make tight contact with the filler neck so that the connection between the pipe 12 and the filler neck will be airtight.

Upon the discharge of oil from the pipe 12, the air in the storage tank will be expelled through the usual venting pipe provided for this purpose. However, if pressure is built up within the tank to a sufficient extent to overcome the force of the spring 26 upon the valve 24, this valve will be lifted from its seat by such pressure in view of the fact that the passages 23 and 20 are in communication with the interior of the tank through the annular recess 18 and the longitudinal channels or recesses 19 which open through the lower portion of the plug. When the valve 24 is raised from its seat, the interior of the storage tank will be vented. The air rushing past the valve will usually carry some oil with it, so that there will be a sputtering of oil from the valve outlet 28, and the attendant will at once be warned that the pressure within the tank has reached the predetermined value to which the valve 24 opens and may then cut off or reduce the supply of oil to the tank or take other necessary precaution to prevent the pressure becoming sufficiently great to rupture the tank.

While I have shown and described a preferred embodiment of my invention, it will be understood that it is not to be limited to all of the details shown, but is capable of modification and variation within the spirit of the invention and within the scope of the claims.

What I claim is:

1. Sealing means for sealing the space between an outlet pipe and the filler neck of a storage tank or the like, said means comprising a plug of compressible material and of frusto-conical shape so as to be tapered exteriorly and make a wedge fit in the filler neck, said plug having an axial bore closely fitting the outlet pipe, an internal annular recess between its upper and lower ends extending transversely of and communicating with said bore, and an outlet passage from said recess to the upper surface of the plug, a valve controlling said outlet passage, an inlet passage leading from said annular recess through the lower surface of the plug, and means pressing said valve toward its seat.

2. Sealing means for sealing the space between an outlet pipe and the filler neck of a storage tank or the like, said means comprising a plug of compressible material and of frusto-conical shape so as to be tapered exteriorly and make a wedge fit in the filler neck, said plug having an axial bore closely fitting the outlet pipe, an internal annular recess between its upper and lower ends extending transversely of and communicating with said bore, and an outlet passage from said recess to the upper surface of the plug, a valve controlling said outlet passage, a plurality of inlet passages leading from said annular recess through the lower surface of the plug, said inlet passages comprising longitudinal recesses in the inner wall of the plug communicating with said bore, and spring means holding said valve to its seat to prevent opening of the valve until pressure in the tank reaches a predetermined amount.

DANIEL KAUFMAN.

REFERENCES CITED

The following references are of record in the file of this patent:

UNITED STATES PATENTS

| Number | Name | Date |
|---|---|---|
| 674,849 | Wiser | May 21, 1901 |
| 753,600 | Maul | Mar. 1, 1904 |
| 987,518 | Wendling | Mar. 11, 1911 |
| 2,018,749 | Veit | Oct. 29, 1935 |
| 2,202,459 | Link | May 28, 1940 |
| 2,208,989 | Lewis | July 23, 1940 |
| 2,353,181 | Neef | July 11, 1944 |